L. POETER.
THROW-OFF MECHANISM FOR FISHING REELS.
APPLICATION FILED JUNE 8, 1916.
1,208,370.
Patented Dec. 12, 1916.
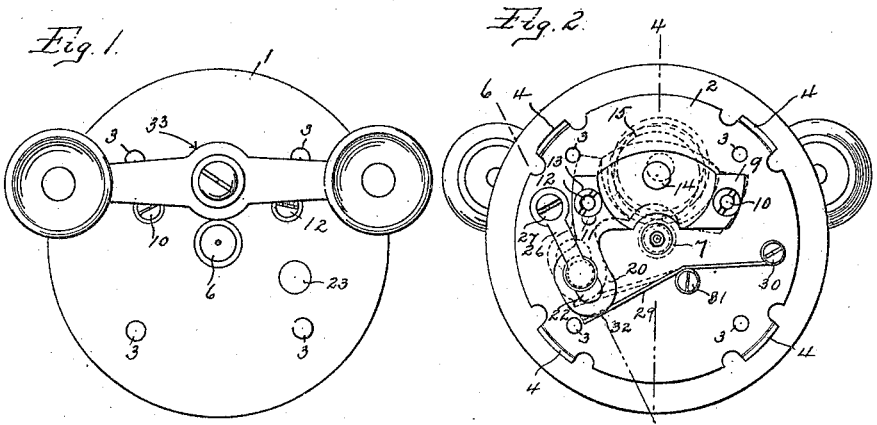
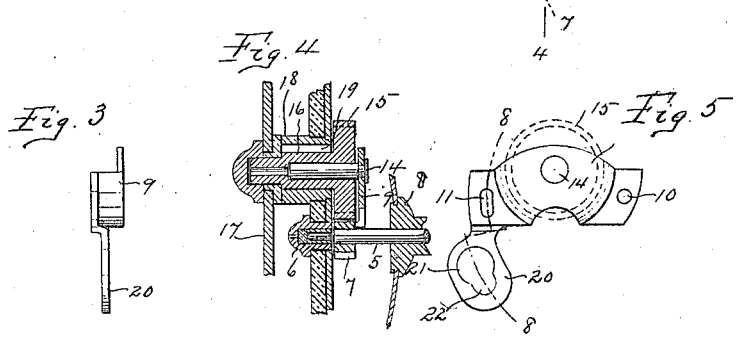
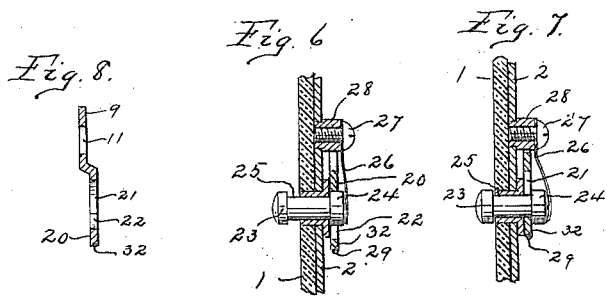
Louis Poeter INVENTOR.
BY
Louis M. Sanders ATTORNEY

UNITED STATES PATENT OFFICE.

LOUIS POETER, OF NEWARK, NEW JERSEY, ASSIGNOR TO A. F. MEISSELBACH & BROTHER, A CORPORATION OF NEW JERSEY.

THROW-OFF MECHANISM FOR FISHING-REELS.

1,208,370.  Specification of Letters Patent.  Patented Dec. 12, 1916.

Application filed June 8, 1916. Serial No. 102,445.

*To all whom it may concern:*

Be it known that I, LOUIS POETER, a citizen of the United States, residing in the city of Newark, county of Essex, and State of New Jersey, have invented certain new and useful Improvements in Throw-Off Mechanism for Fishing-Reels, of which the following is a specification.

My invention relates to that class of fishing reels known in the art as free spool reels, and it contemplates the provision of mechanism for disengaging the main driving gear from the spool pinion so that the spool may revolve freely without hindrance from the winding crank or lever and the intervening train of gears.

In reels of the character to which my invention relates, it is the practice to provide the spool with a brake or drag, so connected to the adjacent end of the reel frame as to apply more or less friction to the paying out of the line from the spool while playing a fish, so that the rotation of the spool is more or less retarded according to the amount of the braking effect.

The present invention has to do with mechanism for shifting the main driving gear out of engagement with the spool pinion so that with the brake or drag out of operation the spool is free to rotate upon its pivot.

In the sport known as bait casting, the fisherman, after paying out a few feet of the line from the end of his fishing rod, gives the same, with the sinker attached thereto, a whirl through the air so that the line with its bait and sinker may be cast to as great a distance from the fisherman as possible, or as he may desire. Any retardation of the spool will correspondingly lessen the distance of the cast; therefore it is essential that no unnecessary friction should come against the rotating parts of the spool. Again, after a cast, such as that just described, it is desirable immediately to throw the gears into engagement again so that the line may be reeled in. At such time, or while the gears are in operative engagement, if any strain is placed upon the line, as for example, the striking of a fish, the mechanism must be of such a character as to positively hold the gears of the driving train in engagement otherwise the catch will be lost. In the excitement of playing a fish, it frequently happens, with many of the free spool reels now on the market, that the driving train becomes disconnected and this entirely because of the fact that the gear train is not in positive locked engagement.

The object of my invention, therefore is to provide mechanism in a so called free spool reel for positively locking the gear train into engagement without the fear of accidental disengagement, and yet to provide means whereby when desired the gear train may be disengaged from the spool so as to permit said spool to freely revolve as in paying out the line wound thereon.

My present invention is an improvement on the structure of the patent granted to Pliny Catucci on April 13th, 1915, #1,135,497, and it comprises a simplified mechanism for separating the main driving gear from the spool pinion by means of a spring, manually released by a push pin projecting from the face of the reel head.

It further comprises mechanism whereby the gear and pinion cannot be locked into partial engagement or into any engagement until the support of the gear is moved into a position for the automatic action of the manually operated means, so that there shall be no intermediate position of partial engagement. This I regard as a valuable feature of my invention.

In carrying out my invention, I make use of the structure illustrated in the accompanying drawings, wherein—

Figure 1, illustrates a front view of a fishing reel containing my improvements. Fig. 2, is a view of the rear face of the front head plate detached from the body of the reel. Fig. 3, is a side elevation of the pivoted bridge which supports the main driving gear. Fig. 4, is a section on line 4—4 of Fig. 2. Fig. 5, is a plan view of the bridge plate. Figs. 6 and 7, are sections on line 6—7 of Fig. 2, showing the parts in their two positions. Fig. 8, is a section on line 8—8 of Fig. 5.

Similar letters of reference refer to like parts throughout the specification and drawings.

In the accompanying drawings I have not deemed it necessary to illustrate the entire mechanism of the reel; such reels are common and well known in the art and my improvement resides solely in the construction of the mechanism for engaging and disengaging the driving gear with and from the spool pinion.

1 is the head plate usually made of hard rubber, or some composition adapted for the purpose.

2 is a substantially circular metal plate rigidly secured to the inner face of the head plate 1, by means of the four rivets 3. The plate 2 is provided with the four offset attaching lugs 4, by which the entire head plate is rigidly but detachably secured to the body of the reel frame, not shown. Projecting through from the front of the head plate 1, and rigidly secured to the plate 2, is the center bearing 6, in which the spool spindle 5, carrying the pinion 7 and spool 8, is mounted to rotate. Located adjacent to the center bearing 6, is the bridge 9, pivoted at 10 to the plate 2, and having its opposite end provided with a slot 11, in which the screw 12 is located, said screw passing through from the front of the head plate 1, and provided with the nut 13, by which the bridge 9 is firmly held to the plate 2, and permitted to oscillate upon the screw 10, to the limits of the slot 11.

Rigidly secured to the bridge 9, is the stub-shaft 14, projecting outwardly beyond the face of the head plate 1, as clearly shown in Fig. 4. Mounted upon this shaft is the main driving gear 15, which is provided with a sleeve hub 16, upon the outer end of which is rigidly secured the driving crank or lever 17. A barrel 18 surrounds the sleeve 16, and is provided with a slightly elongated slot 19, to permit the oscillation of the sleeve 16, together with the stub-shaft 14 and the bridge 9. The main driving gear 15 is in engagement with the spool pinion 7, so long as the bridge is in the position shown in full lines in Fig. 2, but whenever the bridge oscillates into the dotted line position shown in Fig. 2, the gear 15 will be disengaged from the pinion 7 and thereby permit the spool to rotate freely.

As a means for holding the bridge and its associated parts in operative position, the following mechanism is provided: The bridge 9 is provided with an offset arm 20, which has the circular opening 21 and the offset slot 22 therein. Projecting from the face of the head plate 1, through the metal plate 2, is the headed push pin 23, the head 24 of which is circular and of a size to fit the circular opening 21 in the arm 20. The smaller cylindrical portion 25 of the push pin 23, is of a size to fit the smaller or slotted portion 22, of the arm 20. From this construction it will be seen that when the head 24 is located in the circular opening 21, as shown in Fig. 6, the bridge 9 will be locked in the position shown in full lines in Fig. 2. When, however, the push pin 23 is pushed in, as shown in Fig. 7, the bridge would be otherwise free to oscillate upon the pivot 10, to the limit of the slot 11, or until the slot 22 shall encircle the part 25 and lie beneath the head 24 of such push pin. In order to hold the push pin in the locked position, shown in Fig. 6, with the push pin 23 in its outermost position, I provide a flat spring 26 to bear with considerable pressure upon the head 24, to press the push pin 23 outwardly; this spring 26 is rigidly held in position by means of a screw 27, passing through the end of the spring 26, into a screw-threaded thimble 28, which is rigidly secured in the plate 2. In order to throw the bridge 9, with the gear 15, out of engagement with the pinion 7, automatically, I provide the spring 29, rigidly secured at one end at 30, and bearing upon a fulcrum screw 31, intermediate of its ends and having its free end bearing in a groove 32, in the outer end of the arm 20, as clearly shown in Fig. 4.

From the structure thus described, it will be seen that with the push pin 23 in the postion illustrated in Fig. 6, the bridge 9 is locked in place with the gear 15, in engagement with the pinion 7. When, however, the push pin 23 is pushed inwardly against the pressure of the spring 26, the enlarged or circular portion 21 of the opening in the arm 20 will be free from engagement with the head 24, thereupon the spring 29 will throw the bridge 9 into the dotted line position shown in Fig. 2, thereby disengaging the gear 15 from the pinion 7, and permit the free rotation of the pinion 7 and the spindle to which it is attached. To reëngage the parts it is only necessary to press the crank 17 in the direction of the arrow 33, so as to carry with it the bridge 9, back into the full line position, as indicated in Fig. 2, against the pressure of the spring 29. When the bridge reaches the position indicated, then the spring 26 will force the pin 23 outwardly with the head 24, into the enlarged opening 21, shown in Fig. 1, and inasmuch as the head 24 substantially fills the circular part of the opening 21, the parts are locked in position with the gear 15 in engagement with the pinion 7, whereupon the rotation of the crank or lever 17, will result in rotating the pinion 7, and the spool to which it is connected.

It will be seen that the structure described materially reduces the number of parts and simplifies the construction of the throw-off mechanism, and by it there is less wear upon the parts and less liability to disarrangement and breakage, with a consequent reduction in the cost of manufacture.

The spring 29 insures complete disengagement of the gear 15 from the pinion 7, whenever the push pin 23 is pushed completely in. On the other hand, the gears cannot be locked into partial engagement or into any engagement until the bridge 9 is moved into a position to permit the spring 26 to move the push pin 23 outwardly until the head 24 shall be completely seated within the large opening 21. There is no intermediate position; the engagement is snapped in and snapped out as completely as is the case in the forementioned patent to Catucci.

I claim:

1. In a throw-off mechanism for fishing reels, the combination of a spool and a manually driven train of gears for rotating said spool, means for retaining the engagement of the respective gears of said train comprising a spring pressed, oscillating bridge for supporting one of said gears, and automatic locking mechanism for locking said oscillating bridge with said gears in engagement comprising an off-set arm upon said bridge, said arm having a circular opening and an off-set slot therein, and a headed spring-pressed push-pin in said opening to lock said bridge and adapted to be manually depressed to disengage the head of said pin from said opening to release said bridge.

2. In a throw-off mechanism for fishing reels, the combination of a spool, a manually driven train of gears in normal mutual engagement with each other for rotating said spool, a bridge mounted for limited oscillation upon which one of the gears of said train is mounted to rotate, a spring bearing upon said bridge for oscillating the same in one direction to disengage said gears, and locking mechanism for locking said bridge with said gears in engagement when said bridge is manually pressed against the action of said spring comprising an off-set arm upon said bridge, said arm having circular opening and an off set slot therein, and a headed spring-pressed push-pin in said opening to lock said bridge and adapted to be manually depressed to disengage the head of said pin from said opening to release said bridge.

3. In a throw-off mechanism for fishing reels, the combination of a spool, a manually driven train of gears in normal engagement with each other to rotate said spool, a pivotally mounted bridge for supporting one of said gears, a spring for oscillating said bridge in one direction to disengage said gears, and automatic locking mechanism for locking said bridge with said gears in engagement, when manually depressed against the action of said spring comprising an off-set arm upon said bridge, said arm having circular opening and an off set slot therein, and a headed spring-pressed push-pin in said opening to lock said bridge and adapted to be manually depressed to disengage the head of said pin from said opening to release said bridge.

4. In a throw-off mechanism for fishing reels, the combination of a line spool, a manually driven train of gears in normal engagement with each other to rotate said spool, a bridge upon which one of said gears is mounted, said bridge being pivoted at one end to oscillate and carry said gear into and out of engagement with another gear of said train, a spring bearing upon the other end of said bridge, the normal tendency of which is to throw the same in one direction to separate said gears, and locking mechanism for locking said bridge when manually pressed against said spring to reëngage said gears comprising an off-set arm upon said bridge, said arm having a circular opening and an off set slot therein and a headed spring-pressed push-pin in said opening to lock said bridge and adapted to be manually depressed to disengage the head of said pin from said opening to release said bridge.

5. In a throw-off mechanism for fishing reels, the combination of a spool, a train of gears for rotating said spool, a bridge upon which one of said gears is mounted, said bridge being pivoted at one of its ends, a spring bearing upon the opposite end of said bridge to throw said gears out of engagement with each other, manually operated means for shifting said bridge against the action of said spring to reëngage said gears, and spring actuated locking mechanism for locking said bridge in position with said gears engaged comprising an off-set arm upon said bridge, said arm having a circular opening and an off set slot therein and a headed spring-pressed push-pin in said opening to lock said bridge and adapted to be manually depressed to disengage the head of said pin from said opening to release said bridge.

6. In a throw-off mechanism for fishing reels, the combination of a head plate, a spool spindle supported to rotate in said head plate, a train of gears to rotate said spindle, said train of gears being supported by said head plate, a bridge pivotally mounted upon said head plate to carry one gear of said train, a spring bearing upon said bridge to carry said gear out of engagement with said train, means for manually moving said bridge with the gear mounted thereon into engagement with said train against the action of said spring, locking mechanism for engaging said bridge and retaining the same in operative position, and manually operated means for unlocking said mechanism to permit said spring to shift said bridge and thereby disengage the gear mounted thereon from said train comprising an off-set arm upon said bridge, said arm having a circular opening and an off set slot therein, and a headed spring-pressed push-pin in said opening to lock said bridge and adapted to be manually depressed to disengage the head of said pin from said opening to release said bridge.

7. In a throw-off mechanism for fishing reels, the combination of a head plate, a spool spindle pivotally supported by said head plate, a pinion rigidly secured upon said spindle, a manually driven gear in normal engagement with said pinion, a spring for shifting said gear out of engagement with said pinion, spring actuated locking mechanism for locking said gear and pinion in engagement, and manually operated releasing mechanism for unlocking said locking mechanism to permit said spring to disengage said gear from said pinion comprising an off set arm upon said bridge, said arm having a circular opening and an off set slot therein, and a headed spring-pressed push-pin in said opening to lock said bridge and adapted to be manually depressed to disengage the head of said pin from said opening to release said bridge.

LOUIS POETER.

Copies of this patent may be obtained for five cents each, by addressing the "Commissioner of Patents, Washington, D. C."